United States Patent
Terada et al.

[11] Patent Number: 5,945,072
[45] Date of Patent: Aug. 31, 1999

[54] OZONIZER

[75] Inventors: Mitsuo Terada; Yoshiyuki Nishimura, both of Takasago; Takashi Tanioka, Kobe; Misato Shinagawa, Takasago, all of Japan

[73] Assignee: Kabushiki Kaisha Kobe Seiko Sho, Kobe, Japan

[21] Appl. No.: 08/916,397

[22] Filed: Aug. 22, 1997

[51] Int. Cl.$^6$ ....................................................... B01J 19/12
[52] U.S. Cl. ............................................................ 422/186.07
[58] Field of Search ........................... 422/186.07, 186.11

[56] References Cited

U.S. PATENT DOCUMENTS 5,554,345 9/1996 Kitchenman ........................ 422/186.15

FOREIGN PATENT DOCUMENTS

WO 94/08891 4/1994 WIPO.

OTHER PUBLICATIONS

Handbook of Ozone Technology and Applications, vol. 1, Ann Arbor Science, pp. 41–65, 1982.
Patent Abstracts of Japan, vol. 14, No. 43 (C–0681), Jan. 26, 1990, JP 1–275403, Nov. 6, 1989.
Patent Abstracts of Japan, vol. 18, No. 322 (C–1214), Jun. 20, 1994, JP 6–072702, Mar. 15, 1994.
Patent Abstracts of Japan, vol. 12, No. 165 (C–496), May 18, 1988, JP 62–275004, Nov. 30, 1987.
Patent Abstracts of Japan, JP 7–315807, Dec. 5, 1995.
Patent Abstracts of Japan, JP 8–134677, May 28, 1996.
Patent Abstracts of Japan, JP 8–134678, May 28, 1996.

*Primary Examiner*—Daniel J. Jenkins
*Attorney, Agent, or Firm*—Oblon, Spivak, McClelland, Maier & Neustadt, P.C.

[57] ABSTRACT

An ozonizer in which a pair of plate-like electrode plates are arranged opposite to each other so as to form a discharge space therebetween, and ceramic dielectric layers are arranged on the surface on the side of the discharge space of said electrode plates, wherein a plate-like anode 4 is arranged between the dielectrics 31 and 32, extreme ends 41 and 42 having sharp extreme ends of a number of protrusions are formed on both surfaces of the anode 4, the anode 4 is arranged between the dielectrics 41 and 42 in a state where the extreme ends 41 and 42 are in contact with the surfaces of the dielectrics 31 and 32 on both sides, the anode 4 is formed with a number of through-holes extending through both surfaces, and the anode being formed of expanded metal.

2 Claims, 6 Drawing Sheets

1

OZONIZER

BACKGROUND OF THE INVENTION

1. Field of the Invention

The present invention relates to an ozonizer.

2. Related Art

An ozonizer has been heretofore known, for example, in Japanese Patent Publication No. 4-74281 Publication, in which at least one anode and one cathode are oppposedly arranged so as to form a discharge space therebetween, and raw gases such as oxygen, air or the like are allowed to flow into the discharge space to generate ozone. According to the invention disclosed in the aforementioned publication, a number of plane portions arrayed on one and the same plane are arranged on both outer sides of a metal flat plate, parts other than these plane portions are in the form of a recess, a number of small holes for communication of both side portions are bored to provide one side electrode, and a mating electrode is superposed on both sides of the one side electrode through a ceramic plate. More specifically, as shown in FIG. 7, an anode plate 91 formed from a metal flat plate are formed with recesses 93 between both sides (plane portions 92) so as to correspond to each other on both sides, and through-holes 94 are formed in portions formed with the recesses 93 so that both the recesses 93 are communicated with each other. On both sides of the anode plate 91 are arranged plate-like dielectric layers 95 formed of ceramic in face contact with the plane portions 92, and on both outer sides of the dielectric layers 95 are stacked metal cathode plates 96. A power source not shown is connected to the anode plate 91 and the cathode plates 96.

In the aforementioned first constitution, a high voltage high frequency voltage is applied between one electrode (anode plate 91) and the mating electrode (cathode 96) to form a discharge electric field in the recess 93, a creeping discharge is generated in the recess 93 in the outer peripheral portion of the plane portion 92, and a silent discharge is generated at a part (in the recess 93) away from the plane portion 92 to thereby ozonize the raw gas passing through the recess 93. Further, the passing raw gas freely passes through the small hole (through-hole 94) between both sides to thereby complicate a flowpassage of the passing gas, to generate an eddy current at a part to increase the probability in contact with the discharge electric field and the contact time, and to average the flow rate between both sides, thus preventing a variation of the ozonizing efficiency.

There is a further proposal as disclosed in Japanese Patent Publication No. 61-32242 Publication. According to the invention disclosed therein, a filler formed from a metal wire is provided as one electrode in contact with one surface of a solid dielectric, and a filler similar to that as described above or a metal sheet is provided as an opposite electrode in contact with the other surface of the dielectric.

According to the aforementioned second constitution, a filler formed of a metal wire material is used as a discharge electrode and/or a feed electrode (for example, a wire cloth may be used, or a filler formed from a metal wire or a wire cloth such as metal wool may be used instead) to adjust the amount of space in the periphery of the electrode (a diameter of a metal wire of the filler type electrode, a dimension and a shape of the filler, the amount of filler and a position relative to the opposite electrode are suitably determined) whereby even at a lower voltage than prior art (a normal silent charging type ozonizer), the discharge can be stabilized to increase the generating efficiency of ozone.

In the aforementioned first constitution, when the raw gas passes through the discharge generating space (recess 93), energy is obtained mainly from an electron so that an oxygen molecule is dissociated into an oxygen atom, and after this, reacted with the oxygen molecule to generate ozone. Electric power consumed for the discharge is consumed by numberless discharges generated between the ceramic dielectric layer 95 and the anode plate 91 by a voltage applied by a power source and a current flowing through the plane portions in contact with the dielectric layer 95 and the anode plate 91. Here, the discharge generated between the dielectric layer 95 and the anode 91 by the voltage contributes to apply energy to the oxygen molecule while the current flowing at the plane portions 92 in contact with the dielectric layer 95 and the anode 91 does not contribute to reception of energy to the oxygen molecule because no gas flows to the portions as described but substantially all the energy is converted into heat for consumption. In this constitution having a number of plane portions 92, there are many power which is invalid with respect to power introduced, posing a problem in that the ozone generating efficiency is poor.

In the aforementioned second constitution, in the case where a wire cloth is used as a filler, that is, in the case where a wire cloth is used as a discharge electrode (anode), it is considered that a contact area between the solid electric and the discharge electrode is smaller than that of the first constitution but there is a problem as mentioned later.

FIG. 4 shows a general wire cloth. This drawing shows one of Industrial Woven Wire Cloth set forth in JIS G 3556. This wire cloth has a shape in which longitudinal wires and lateral wires having a circular section are interconnected each other while keeping a predetermined spacing.

It is known that when the dielectric comes in contact with the discharge electrode, an intense discharge occurs in the vicinity of the apex of the contact portion. In the case where the wire cloth as described above is used as a discharge electrode, since the all the periphery of the apex of the contact portion has a curved surface, the space in the vicinity of the contact portion is narrow, and the raw gas is hard to flow into the space. For this reason, the rate is low in which the intense discharge contributes to apply energy to the oxygen molecule. Further, at the time of assembling so that the wire cloth as the discharge electrode comes in contact with the dielectric, when a pressing force acts therebetween, the contact area easily increases, and a face contact portion is substantially formed. Therefore, there are much power which is invalid with respect to power introduced.

Further, the wire cloth is low in rigidity since their stocks are not connected integrally. In the case of the construction in which a wire cloth as a discharge electrode is sandwiched by dielectric as in an ozonizer of a flat plate type, it is difficult to keep a discharge generating space in a predetermined spacing, failing to obtain an even discharge and an even flow of raw gas. Therefore, there is a problem in that discharge energy cannot be effectively used.

In the case of using metal wool, there is the following problem in addition to the problem of holding a discharge generating space as described above. Since metal wool is indefinite in shape, it is difficult to make density of parts of a filler uniform. Therefore, when the raw gas passes through the discharge generating space, that is, a filler member, the raw gas mainly passes through a portion where density of the filler is low. Therefore, there poses a problem in that discharge energy cannot be effectively used.

Accordingly, also in the second constitution, there is much power which is invalid with respect to power introduced, and the ozone generating efficiency is poor.

This invention has been achieved for solving the problems as noted above with respect to prior art, and provides an ozonizer which is less in power which is invalid with respect to power introduced, and which is good in ozone generating efficiency.

SUMMARY OF THE INVENTION

As a preferred embodiment, there is provided an ozonizer comprising at least one discharge space formed between electrodes; ceramic dielectric layers arranged on both sides of said discharge space; a plate-like anode arranged between the dielectric layers; and a number of protrusions formed on both surfaces of the anode, said protrusions and said dielectric layers being arranged in the point-contact state.

In this case, the anode and the dielectric layers are in point contact so that an area of the direct contact portion is close to 0. Therefore, power loss is rare, and accordingly, substantially all the energy of power introduced contributes to discharge, as a consequence of which the ozone generating efficiency is excellent.

More preferably, the anode is formed with a number of through-holes in communication with both sides.

In this case, since the raw gas flowing into a discharge space freely flows between both dielectric layers, gases in a discharge portion therebetween are not eccentric, and accordingly, no lowering of the efficiency caused by the eccentricity of ozone generation occurs.

According to a further preferred embodiment, there is provided a flat plate type ozonizer comprising at least one discharge space formed between electrodes; ceramic dielectric layers arranged on both sides of said discharge space; and an anode formed of expanded metal arranged in a state in contact with said dielectric layers to thereby simultaneously constitute a through-hole communicated with both sides of the anode and protrusions in point-contact with the dielectric layers.

In this case, since the expanded metal is used for the anode, it is possible to easily manufacture an anode construction having a number of point-contacts on both surfaces and in which the raw gas freely flows into the both sides. Further, the anode construction is high in rigidity because of its integral formation. Therefore, a discharge generating space can be held in a predetermined gap by simple assembling operation for sandwiching the anode construction between the dielectric layers on both sides.

DESCRIPTION OF PREFERRED EMBODIMENTS

Figure 1:
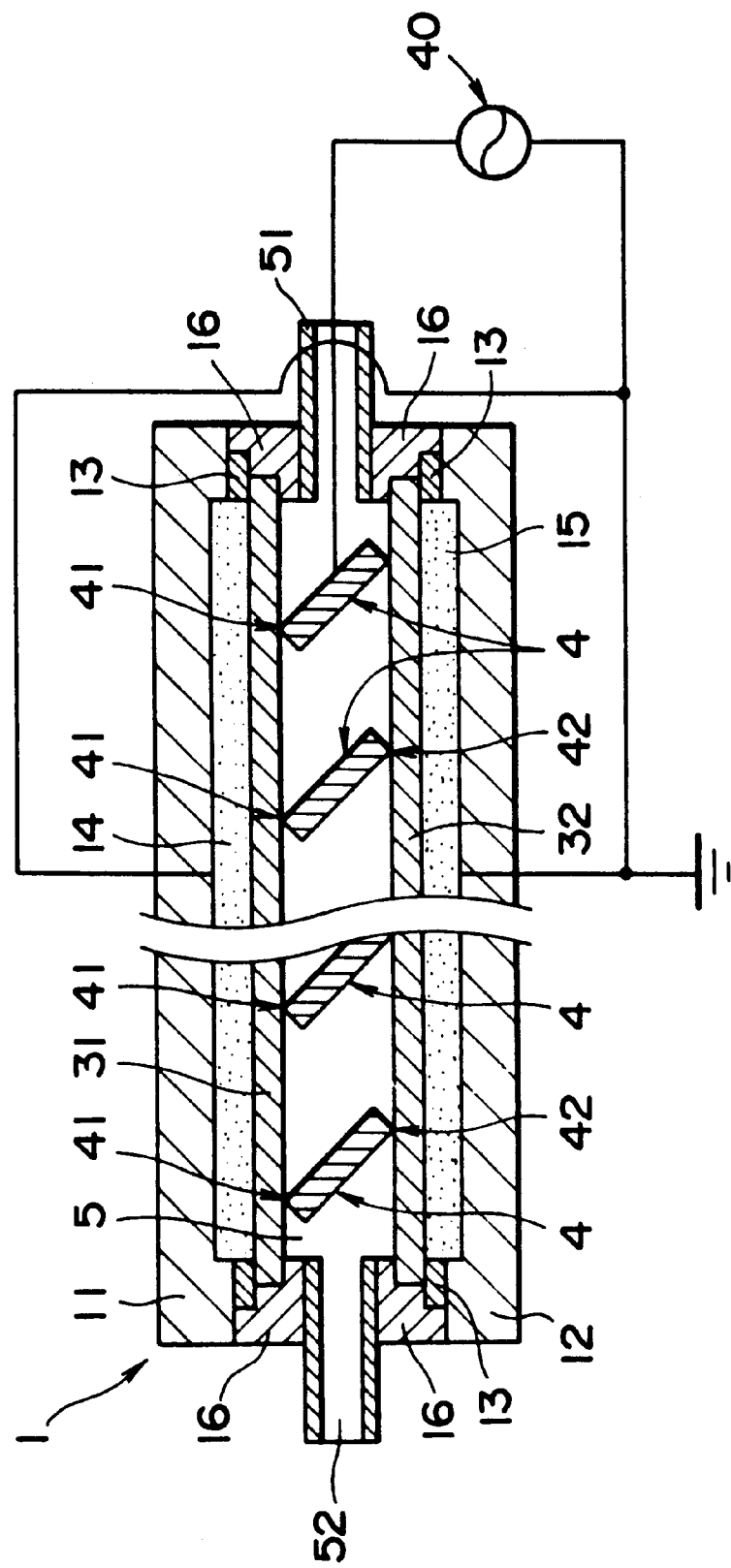
FIG. 1 is a partly cutaway sectional view of an ozonizer showing one embodiment of the present invention.

In FIG. 1, an ozonizer 1 comprises a pair of flat plate-like frames 11, 12 formed of an insulating material, dielectric layers 31, 32 formed of ceramic mounted thereon, and an anode 4 arranged between the dielectric layers 31, 32. The frames 11, 12 are arranged oppositely to each other, the dielectric layers 31, 32 are mounted on the opposed surfaces thereof with a seal 13 intervened between the peripheral edges thereof, and cooling water passages 14, 15 are formed between the dielectric layer 31 and the frame 11 and between the dielectric layer 32 and the frame 12, respectively. In the example of the ozonizer shown in FIG. 1, cooling water passing through the cooling water passages 14, 15 is used as a cathode. Of course, an anode may be constituted by a metal plate as is well known. A spacer 16 is intervened between the peripheral edges of the frames 11, 12 so as to surround the dielectric layers 31, 32 so that the dielectric layers 31 and 32 are held so as to keep a predetermined spacing therebetween. A raw gas supply pipe 51 is mounted on one side of the spacer 16, and an ozone gas removing pipe 52 is mounted on the other side thereof.

Figure 2:
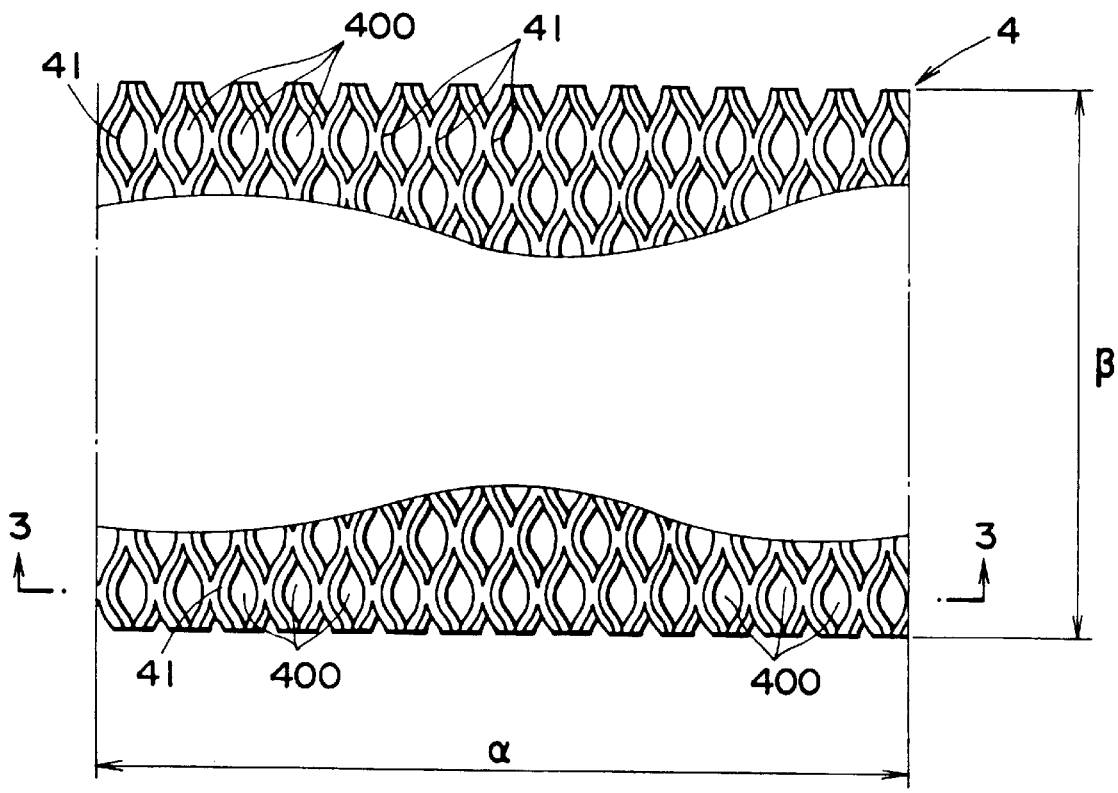
FIG. 2 is a partly cutaway plan view of an anode shown in FIG. 1.
Figure 3:
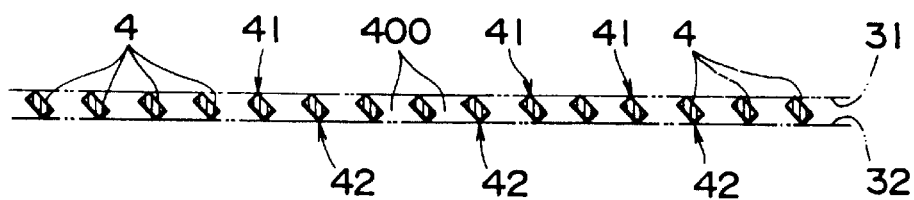
FIG. 3 is a sectional view taken on line A—A of FIG. 2.
Figure 4:
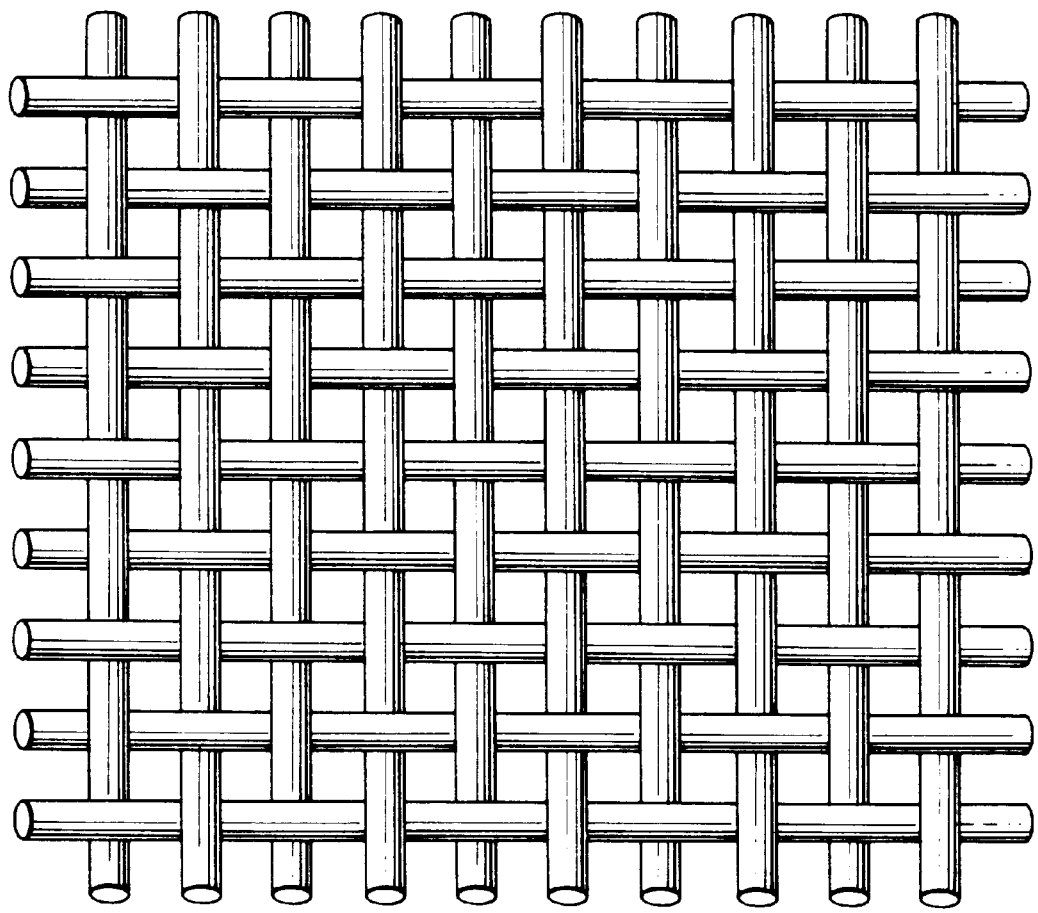
FIG. 4 is an explanatory view of a general wire cloth.

A power source 40 is connected to the anode 4 and the cooling water passages 14, 15. For this anode 4, well known expanded metals which are similar in shape to expanded metals set forth in JIS G 3351, as shown in FIGS. 2 and 3. The plane shape of the expanded metals is a shape in which wavy members are arranged adjacent to each other as shown in FIG. 2, but the sectional shape is a shape in which a plurality of inclined rectangles are arranged in a spaced relation as shown in FIG. 3. (Diagonal) corners opposite to each other of the section comprise a top point (an extreme end of protrusion) 41 and a bottom point (an extreme end of protrusion) 42, the top point 41 coming into contact with the surface of the dielectric layer 31 and the bottom point 42 coming into contact with the surface of the dielectric layer 32. That is, in the anode 4, the top point 41 and the bottom point 42 are formed every mesh of a net, and when the anode 4 is sandwiched between the dielectric layer 31 and the dielectric layer 32, the top point 41 and the bottom point 42 come in point-contact with the dielectric layers 31 and 32. Further, since the anode 4 is in the form of meshes of a net, a number of spaces 400 extending though both sides, and accordingly, all the discharge space 5 between the dielectric layers 31 and 31 communicates.

Expanded metals are used for the anode because it is possible to easily manufacture the construction in which a number of contact points are provided on both surfaces, and gases freely flow into both sides. Alternatively, however, an arrangement wherein a number of sharpened-end protrusions are formed on both surfaces of a metal flat plate may be used, in place of expanded metals as described above, and an anode may be arranged between the dielectrics in a state where the extreme ends of the protrusions are in contact with the surfaces of the dielectric layers on both sides. In this case, preferably, the flat plate is formed with a number of small holes extending through the both sides.

With the above-described constitution, when a voltage is applied between the anode 4 and the cathode, a preliminary ionization is first generated at a contact portion between the top point 41 of the anode 4 and the dielectric layer 31 and at a contact portion between the bottom point 42 and the dielectric layer 32 so that a discharge starts. With the start of this discharge, the electron density therearound increases, and as a result, the discharge phenomenon spreads from these point contact portions to the discharge space 5 in the periphery thereof. Thereby, the raw gas flowing into the discharge space 5 is ozonized. Since at this time, the raw gas flowing into the discharge space 5 freely flows between both the dielectric layers 31 and 32, no one-sided discharge state occurs therebetween, and accordingly, no lowering of discharge efficiency caused by one-sided discharge state occurs. Further, only energization without discharge is effected at the point contact portion (a portion in direct contact), which does not contribute to ozonization, resulting in power loss. However, since in the above-described construction, the point contact occurs and an area of the direct contact portion is close to 0, power loss is rare, and substantially all the energy of power introduced contributes to discharge, as a result of which the generating efficiency of ozone is excellent.

Figure 7:
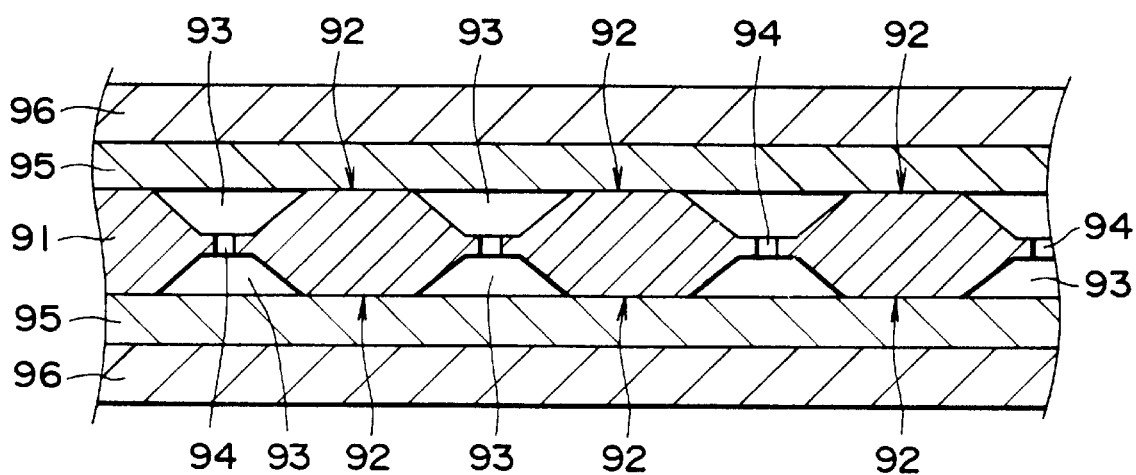
FIG. 7 is a sectional view of a conventional ozonizer.

On the other hand, since in the conventional construction shown in FIG. 7, a number of face contact portions (plane portions 92) are present, a considerable amount of power loss occurs due to a current flowing into the face contact portions. More specifically, let A be the total area of the anode 4 (for example, a case of FIG. 2, $A=\alpha \times \beta$), and X be the number of the plane portions 92, then, the number of plane portions in contact per unit area is X/A. Let S be the area per plane portion in face contact with the dielectric layer, then an area in face contact per unit area is S×X/A. Accordingly, for an anode having plane portions, a discharge area is reduced by the plane portions. A discharge power density W1 of the construction of the face contact in the case where power of P is introduced and a discharge power density W2 of the construction of the point contact are expressed by equations below.

$$W1=P/(A-S \times X)$$

$$W2=P/A$$

It is generally known that when the discharge power density is low, the good generating efficiency of ozone is obtained. Since in the above equations, W1>W2, the construction of the point-contact is better in efficiency than that of the face-contact.

Out of the constructions of point-contact as described above whose efficiency is said to be good, a construction in which a contact portion between an anode and a dielectric is edge-like or sharp is more preferable. By the provision of the edge-like or sharp contact portion, it is possible to sufficiently secure a flowing space of raw gas in the vicinity of the apex of the contact portion where an intensive discharge occurs. Therefore, there increases the rate for contributing to the fact that the intensive discharge applies energy to an oxygen molecule.

Figure 5:
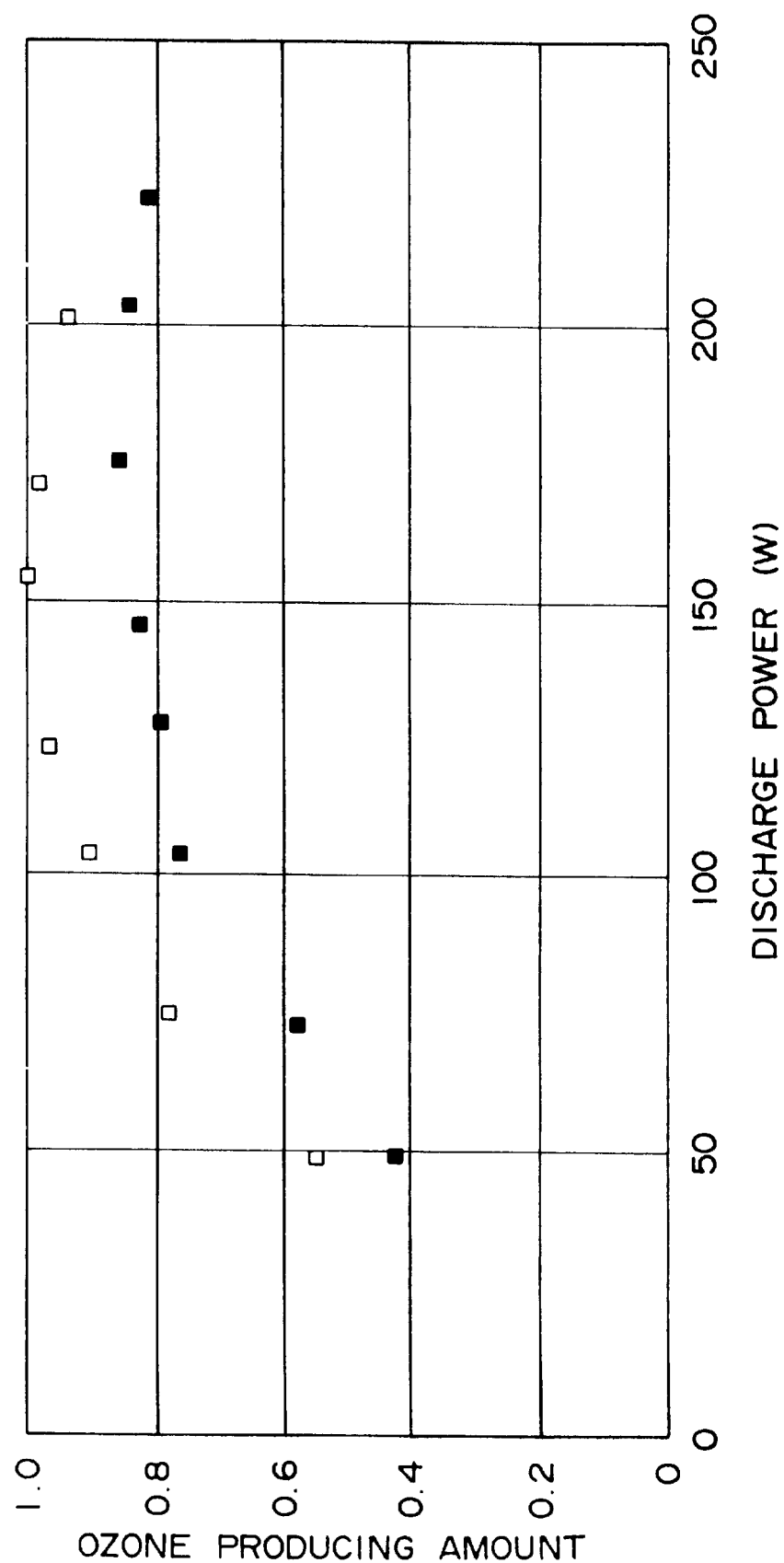
FIG. 5 is a comparative view showing the amount of producing ozone with respect to discharge power in the case where expanded metals or wire cloth are used as an anode. A symbol □ indicates data of expanded metals, and a symbol ■ indicates data of wire cloth. The ozone producing amount of vertical axis means the ratio of ozone concentration measured value to ozone concentration maximum value.

FIG. 5 shows that expanded metals and wire cloth are used for an anode, and the amount of producing ozone with respect to discharge power is experimentally confirmed. The experiment was conducted under the conditions that a gap of a discharge space is 1.5 mm, a dimension of meshes is 6.0 mm×3.3 mm, the number of meshes per 1 square inch is 30. It was found that expanded metals having an edge-like contact portion is excellent in ozone generating efficiency than wire cloth having a curved contact portion.

Figure 6:
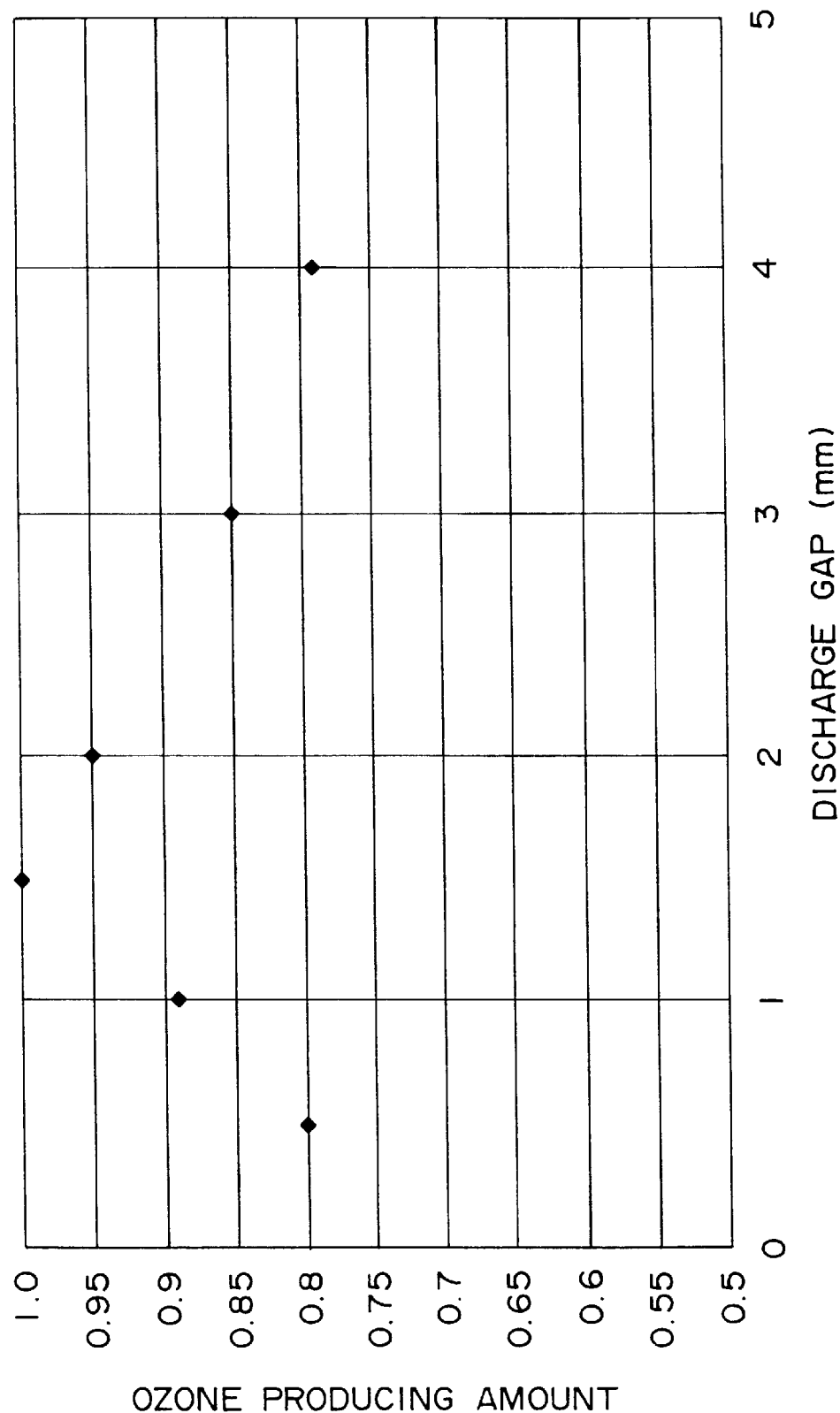
FIG. 6 is a relational view showing the amount of producing ozone with respect to a gap of discharge space in the case where expanded metals are used as an anode. The ozone producing amount of the vertical axis means the ratio of ozone concentration measured value to ozone concentration maximum value.

FIG. 6 shows that in the case where expanded metals are used as an anode, a discharge power is set to approximately 150 W, and a gap of a discharge space is varied, the ozone producing amount is experimentally confirmed. In the case where the gap of the discharge space is 1.5 mm, most excellent efficiency was obtained.

It is noted that the constitution of an ozonizer is not limited to the above-described embodiments, but the present invention can be applied to all kinds of constitutions of ozonizer.

In the present embodiment, since the anode and the dielectric layers are of the point contact, and the area of the direct contact portion is close to 0, power loss is rare, and accordingly, substantially all the energy of power introduced contributes to discharge, and as a result, the ozone generating efficiency is excellent.

Further, since the raw gas flowing into the discharge space freely flows between both the dielectric layers, no one-sided flow of gas in the discharge portion therebetween occur, and accordingly, no lowering of efficiency cause by one-sided generation of ozone occurs.

In the present embodiment, since expanded metals are used as an anode, it is possible to easily manufacture the anode construction in which both surfaces have a number of contact points and gases freely flow into both sides.

Moreover, since expanded metals are high in rigidity, it is possible to secure a discharge generating space in a predetermined spacing by a simple assembling operation in which the anode construction is sandwiched between both the dielectric layers.

We claim:

1. An ozonizer comprising:
   two cathodes;
   two ceramic dielectric layers positioned between said cathodes and defining a discharge space therebetween;
   an expanded metal plate positioned in said discharge space, said expanded metal plate having a plurality of through holes and engaging both of said dielectric layers with substantially point contact adjacent each of said through holes;
   an electrical power source connected to said cathodes and to said expanded metal plate such that said expanded metal plate comprises an anode, whereby an electrical discharge in the discharge space can ozonize an oxygen bearing gas in the discharge space.

2. The ozonizer according to claim 1, wherein said cathodes each comprise a cooling water passage.

* * * * *